(12) United States Patent  (10) Patent No.: US 8,486,536 B2
Zou et al.  (45) Date of Patent: Jul. 16, 2013

(54) GLASS MATERIAL FOR PRESS MOLDING, METHOD FOR MANUFACTURING OPTICAL GLASS ELEMENT USING SAME, AND OPTICAL GLASS ELEMENT

(75) Inventors: Xuelu Zou, Shinjuku-ku (JP); Hiroshi Kouno, Shinjuku-ku (JP); Kouichiroh Shiraishi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/320,466

(22) PCT Filed: May 14, 2010

(86) PCT No.: PCT/JP2010/058198
§ 371 (c)(1),
(2), (4) Date: Feb. 2, 2012

(87) PCT Pub. No.: WO2010/131741
PCT Pub. Date: Nov. 18, 2010

(65) Prior Publication Data
US 2012/0134027 A1   May 31, 2012

(30) Foreign Application Priority Data

May 15, 2009 (JP) ................................. 2009-118615

(51) Int. Cl.
*C03C 17/00* (2006.01)
*C03C 17/34* (2006.01)
*C03B 11/00* (2006.01)
*C03B 40/00* (2006.01)
*G02B 1/11* (2006.01)

(52) U.S. Cl.
USPC ............... 428/428; 428/336; 65/102; 501/46; 501/47; 501/48; 501/49; 501/52; 501/78; 501/79; 501/901; 501/903

(58) Field of Classification Search
None
See application file for complete search history.

(56) References Cited

U.S. PATENT DOCUMENTS 4,363,852 A * 12/1982 Nakajima et al. ............. 428/432
5,168,404 A * 12/1992 Miyazaki et al. ............. 359/718
(Continued)

FOREIGN PATENT DOCUMENTS

JP     2-1779 B2    1/1990
JP     4-83724 A    3/1992
(Continued)

OTHER PUBLICATIONS

Chinese Office Action corresponding to Chinese Patent Application No. 201080021374.1, dated Sep. 27, 2012.
(Continued)

*Primary Examiner* — David Sample
(74) *Attorney, Agent, or Firm* — Sughrue Mion, PLLC

(57) ABSTRACT

Disclosed is a glass material for press forming providing an optical element having a sufficient optical performance without surface cracks, cloudiness, scratches, and the like even when the glass material contains a highly reactive component. Also disclosed are an optical element having a sufficient optical performance without surface cracks, cloudiness, scratches, and the like and a method for manufacturing the same. Specifically disclosed is a glass material for press forming which comprises a core portion composed of multicomponent optical glass and a surface glass layer covering at least a region serving as an optical functional surface of the core portion. The surface glass layer contains more than 90 mass % of $SiO_2$, and the thickness of the layer is less than five nanometers. Also specifically disclosed is a method for manufacturing a glass optical element by heating the glass material and by press forming the softened glass material using a forming die. Yet also specifically disclosed is a press formed glass optical element having a core portion composed of multicomponent optical glass and a surface glass layer covering at least an optical functional surface of the core portion. The surface glass layer contains more than 90 mass % of $SiO_2$, and the thickness of the layer is less than five nanometers.

17 Claims, 5 Drawing Sheets

U.S. PATENT DOCUMENTS

| | | | |
|---|---|---|---|
| 5,192,352 A * | 3/1993 | Kuwabara et al. | 65/60.53 |
| 5,843,200 A * | 12/1998 | Richards | 65/102 |
| 5,851,252 A * | 12/1998 | Sato et al. | 65/24 |
| 2007/0232477 A1 | 10/2007 | Fujiwara | |
| 2009/0314033 A1* | 12/2009 | Zou et al. | 65/60.1 |
| 2012/0135199 A1* | 5/2012 | Satou et al. | 428/172 |

FOREIGN PATENT DOCUMENTS

| | | |
|---|---|---|
| JP | 7-118025 A | 5/1995 |
| JP | 8-217466 A | 8/1996 |
| JP | 08217466 | 8/1996 |
| JP | 2000-351636 A | 12/2000 |
| JP | 3492005 B2 | 11/2003 |
| JP | 2004-250295 A | 9/2004 |
| JP | 2006-193389 A | 7/2006 |
| JP | 2007-261877 A | 10/2007 |
| WO | 2007114170 A1 | 10/2007 |

OTHER PUBLICATIONS

Japanese Office Action mailed Jul. 12, 2011 in Patent Application No. JP 2010-111973.

Japanese Office Action mailed Oct. 4, 2011 in Patent Application No. JP 2010-111973.

* cited by examiner

GLASS MATERIAL FOR PRESS MOLDING, METHOD FOR MANUFACTURING OPTICAL GLASS ELEMENT USING SAME, AND OPTICAL GLASS ELEMENT

CROSS REFERENCE TO RELATED APPLICATIONS

This application is a National Stage of International Application No. PCT/JP2010/058198, filed on May 14, 2010, which claims priority from Japanese Patent Application No. 2009-118615, filed on May 15, 2009, the contents of all of which are incorporated herein by reference in their entirety.

TECHNICAL FIELD

The present invention relates to a glass material used for molding by precision press molding to obtain optical glass elements, to a method for manufacturing optical elements using the glass material, and to an optical glass element.

More particularly, when employing a glass material comprising components that are highly reactive with the molding surfaces of the pressing mold at elevated temperatures during press molding, the present invention suppresses the reaction of these components with the molding surfaces, and can be primarily applied to stably and efficiently produce optical elements of adequate optical performance while preventing fusion, clouding, scratches, and other reaction traces on the surface of the molded article, thereby extending the service life of the pressing mold.

BACKGROUND ART

It is known that a glass material that has been softened by heating can be press molded with a pressing mold to transfer the shape of the molding surface to the glass material, thereby producing an optical element such as a glass lens. The optically functional surfaces of an optical element that has been formed by press molding possess the desired optical performance without being subjected to mechanical processing such as polishing.

Patent Reference 1 discloses a method of manufacturing pressed lenses by placing a glass material (preform), the surface of which has been coated with a silicon oxide film, in a pressing mold, and press molding the glass material at a temperature at which it is in a softened state. This method is described as preventing fusion of the mold and glass during press molding, and preventing the precipitation of reduced particles due to reduction of PbO contained in the glass.

Patent Reference 2 discloses a method for molding optical glass elements by forming a thin layer comprised primarily of $SiO_2$ in the center portion of the surface of a glass element in advance, and placing the glass material in a pressing mold and conducting press molding. This method is considered to yield an optical element having an optically functional surface such that the occurrence of surface cracks is avoided and no clouding is generated in the center portion.

Patent Reference 3 discloses an optical element having a glass core that has been premolded, on the surface of which double surface layers are formed. The first surface layer is formed as a film on the surface of the glass core at a temperature greater than or equal to the glass transition point while the glass core material is in a state of reduced pressure, and the second surface layer is formed as a film on the first outer layer by sputtering a vapor deposition-use glass material. Patent Reference 3 also discloses a method for manufacturing an optical element. A glass material comprising 70 to 90 mass % of $SiO_2$ is employed as the vapor deposition-use glass material to form the second outer layer. According to the invention, even when a glass containing strongly reactive glass or highly volatile glass components is employed as the glass material, an optical component can be obtained that is free of surface cracks, fusion, and clouding.

PRIOR ART REFERENCES

[Patent Reference]
[Patent Reference 1] JP-B-H02-1779 (1990)
[Patent Reference 2] JP-A-H07-118025 (1995)
[Patent Reference 3] JP-A-H08-198631 (1996)

The entire contents of Patent References 1 to 3 are hereby incorporated by reference.

According to the invention described in Patent Reference 1, the practical range of the thickness of the silicon oxide film is 50 to 2,000 Angstroms (5 to 200 nm). At below 50 Angstroms (5 nm), the effect of silicon oxide film formation is not achieved, and at greater than 2,000 Angstroms, defects such as cracks tend to occur during press molding, compromising optical qualities such as transmittance and the refractive index.

According to the invention described in Patent Reference 2, the thickness of the thin film comprised primarily of $SiO_2$ is 100 to 200 Angstroms. At less than 100 Angstroms (10 nm), there is no preventive effect on clouding, and at greater than 200 Angstroms, surface cracking is reported to occur.

According to the invention described in Patent Reference 3, the thickness of the second outer layer comprised principally of $SiO_2$ is 5 to 50 nm. At less than 5 nm, the fusion-preventing effect (between the mold and glass) decreases, and at greater than 50 nm, cracks are reported to appear.

However, based on research conducted by the present inventors, it was discovered that even at glass film thicknesses that are considered to be suitable (a range of 5 to 50 nm) in the inventions described in Patent References 1 to 3, depending on the type of glass, cracks appear in the glass film following press molding, with glass from the core that flows out through the cracks fusing with the pressing mold, and it is impossible to obtain a glass element with adequate optical performance or good external appearance. In particular, when a glass comprising any of W, Ti, Bi, and Nb among the glass core components is press molded, such problems become pronounced.

Glass materials having various optical constants and physical and chemical properties based on the uses of the optical elements obtained by molding are desirable for use in precision press molding. In particular, high refractive index (for example, an nd of 1.7 or higher) and high dispersion (a vd of 30 or lower) optical glasses and high refractive index (same as above) and low dispersion (for example, a vd of 30 or higher) optical glasses play important roles in small image pickup devices and the like, and the need for them is remarkable. The present inventors have discovered a highly refractive glass material that meets such requirements.

The use of glass compounds such as W, Ti, Bi, and Nb is advantageous for achieving a high refractive index. However, these components can adopt multiple valences while presenting as glass components, and tend to undergo oxidation/reduction reactions. For example, depending on the atmosphere and temperature during press molding, they tend to undergo reduction. Glass materials that comprise highly reactive components, such as the above representative components, have been discovered to undergo various interface reactions with molding surfaces in the process of being pressed against the pressing mold and deforming at pressing temperatures. They fuse to the molding surfaces, or cause reaction traces such as clouding and scratches to remain on the surface of the molded glass article. Due to fusing, the molding surface becomes rough. When it is transferred, it has been determined that irregularities tend to be produced on the surface of the molded article and clouding tends to be observed.

The present invention, devised in light of the above circumstances, has as its object to provide an optical element affording adequate optical performance without surface cracking, clouding, scratches, and the like, while suppressing unwanted interface reactions such as fusion of the mold and glass in the course of press molding even when the glass material comprises highly reactive components in the manufacturing of an optical element by press molding a glass material comprised of optical glass.

Means of Solving The Problem

Accordingly, the present invention is characterized by the following configuration.

[1] The glass material for press molding of the present invention is characterized by having a core member comprised of an optical glass with a multiple component system, and a surface glass layer covering at least an area of the core member that is to become an optically functional surface, with the surface glass layer comprising more than 90 mass % of $SiO_2$ and being less than 5 nm in thickness.

When the glass material of the present invention is employed in press molding, molding is conducted with a surface glass layer inserted on at least an area of the core member that will become an optical functional surface between the core member and the pressing mold. Thus, contact between the core member and the pressing mold is suppressed and reaction between the surface of the core member and the surface of the pressing mold is suppressed. Thus, glass fusion and clouding caused by the reaction, and the generation of surface cracks, scratches, and the like due to press molding, are suppressed. As a result, it becomes possible to manufacture an optical element affording high-quality optical performance.

[2] The glass material for press molding of the present invention is characterized in that in the invention described in [1], the core member is comprised of an optical glass comprising at least one readily reducing component from the group consisting of W, Ti, B, and Nb, and not comprising Pb, and in that the thickness of the surface glass layer is 1 nm or greater.

Since the glass material of the present invention has a high refractive index, when employed in press molding, an optical glass element having a high refractive index can be manufactured with high precision.

[3] The glass material for press molding of the present invention is characterized in that in the invention described in [1] or [2], the core member is an optical glass comprising, denoted as mole percentages: 10 to 45% $P_2O_5$, 3 to 35% $Nb_2O_5$, 2 to 35% $Li_2O$; 0 to 25% $TiO_2$; 0 to 20% $WO_3$; 0 to 40% $Bi_2O_3$; 0 to 20% $B_2O_3$; 0 to 25% BaO; 0 to 25% ZnO; 0 to 50% $Na_2O$; 0 to 20% $K_2O$; 0 to 15% $Al_2O_3$; and 0 to 15% $SiO_2$ (where the combined quantity of $WO_3$, $TiO_2$, $Bi_2O_3$, and $Nb_2O_5$ is not less than 10% but less than 65%).

The glass material of the present invention has a high refractive index and high dispersion. Thus, when employed in press molding, an optical glass element having a high refractive index, high dispersion, and good shape precision can be obtained.

[4] The glass material for press molding of the present invention is characterized in that in the invention described in [1] or [2], the core member is an optical glass comprising, denoted as mole percentages: 0 to 50% $SiO_2$; 5 to 70% $B_2O_3$; 0 to 20% $Li_2O$; 0 to 10% $Na_2O$; 0 to 10% $K_2O$; 1 to 50% ZnO; 0 to 10% CaO; 0 to 10% BaO; 0 to 10% SrO; 0 to 10% MgO; 5 to 30% $La_2O_3$; 0 to 22% $Gd_2O_3$; 0 to 10% $Yb_2O_3$, 0 to 15% $Nb_2O_5$; 0 to 20% $WO_3$, 0 to 40% $TiO_2$; 0 to 20% $Bi_2O_3$; 0 to 15% $ZrO_2$; 0 to 20% $Ta_2O_5$; and 0 to 10% $GeO_2$.

The glass material of the present invention has a high refractive index and low dispersion. Thus, when employed in press molding, an optical glass element having a high refractive index, low dispersion, and good shape precision can be obtained.

[5] The glass material for press molding of the present invention is characterized in that in the invention described in any one of [1] to [4], the glass material has a shape close to that of the glass molded article that is obtained by press molding.

According to the present invention, by press molding a glass material with a shape (also referred to hereinafter as a "similarly shaped glass material") close to that of the glass molded article obtained by press molding, the rate of change in shape of the glass material during press molding is kept low and, as a result, the amount of extension of the surface glass layer is kept small. Thus, the loss of surface layer function due to the occurrence of cracking, excessive thinning of the surface glass layer, and the like is further prevented.

[6] The glass material for press molding of the present invention is characterized in that in the invention described in [5], the glass material with a shape close to that of the molded glass article has a shape such that the rate of change in center thickness due to press molding is 50% or less and the rate of change in the outside diameter is 50% or less.

In particular, when employing a similarly shaped glass material with a rate of change in center thickness due to press molding of 50% or less and a rate of change in outside diameter of 50% or less, a glass element having high-quality optical performance can be readily manufactured without the occurrence of surface cracking, clouding, scratching, or the like.

[7] The glass material for press molding of the present invention is characterized in that in the invention of any one of [1] to [6], there is a convex surface on one side and a concave surface on the reverse side.

The glass material of the present invention is suitably a glass material forming a meniscus lens with a convex surface on one side and a concave surface on the other side. By slightly deforming the glass material by press molding, an optical element having high-quality optical performance can be readily manufactured without the occurrence of surface cracking, clouding, scratching, or the like.

[8] The method for manufacturing an optical glass element of the present invention is characterized in that the glass material described in any one of [1] to [7] is heated and the softened glass material is press molded in a pressing mold to obtain an optical glass element.

The method for manufacturing an optical glass element of the present invention suppresses reaction due to contact between the core member and the pressing mold, suppresses the occurrence of surface cracking, clouding, scratching, and the like, and permits the manufacturing of an optical glass element affording high-quality optical performance.

[9] The method for manufacturing an optical glass element of the present invention is characterized in that in the invention described in [8], the pressing mold has a carbon-containing mold release film.

According to the present invention, when employing a pressing mold having a carbon-containing mold release film on the molding surface, it is possible to readily manufacture an optical element affording high-quality optical performance without the occurrence of surface cracking, clouding, scratching, or the like.

[10] The optical glass element of the present invention is characterized by being a press molded optical glass element comprising a core member comprised of optical glass with a multiple component system and a surface glass layer covering at least an optically functional surface of the core member, and in that the surface glass layer comprises more than 90 mass % of $SiO_2$ and is less than 5 nm in thickness.

In the optical glass element of the present invention, since no reaction occurs due to contact between the core member and the pressing mold in the course of press molding, surface cracking, clouding, scratching and the like do not occur and high-quality optical performance is afforded.

[11] The optical glass element of the present invention is characterized in that in the optical glass element described in [10], the core member comprised of optical glass comprises at least one readily reducing component selected from among W, Ti, Bi, and Nb and comprises no Pb; and the thickness of the surface glass layer is 1 nm or greater.

The present invention provides a high-quality optical glass element of high refractive index.

[12] The optical glass element of the present invention is characterized in that in the optical glass element described in [11], the core member is an optical glass comprising, denoted as mole percentages: 10 to 45% $P_2O_5$, 3 to 35% $Nb_2O_5$, 2 to 35% $Li_2O$; 0 to 25% $TiO_2$; 0 to 20% $WO_3$; 0 to 40% $Bi_2O_3$; 0 to 20% $B_2O_3$; 0 to 25% BaO; 0 to 25% ZnO; 0 to 50% $Na_2O$; 0 to 20% $K_2O$; 0 to 15% $Al_2O_3$; and 0 to 15% $SiO_2$ (where the combined quantity of $WO_3$, $TiO_2$, $Bi_2O_3$, and $Nb_2O_5$ is not less than 10% but less than 65%).

The present invention provides a high-quality optical glass element with a high refractive index, high dispersion, and good shape precision.

[13] The optical glass element of the present invention is characterized in that in the optical glass element described in [11], the core member is an optical glass comprising, denoted as mole percentages: 0 to 50% $SiO_2$; 5 to 70% $B_2O_3$; 0 to 20% $Li_2O$; 0 to 10% $Na_2O$; 0 to 10% $K_2O$; 1 to 50% ZnO; 0 to 10% CaO; 0 to 10% BaO; 0 to 10% SrO; 0 to 10% MgO; 5 to 30% $La_2O_3$; 0 to 22% $Gd_2O_3$; 0 to 10% $Yb_2O_3$; 0 to 15% $Nb_2O_5$; 0 to 20% $WO_3$, 0 to 40% $TiO_2$; 0 to 20% $Bi_2O_3$; 0 to 15% $ZrO_2$; 0 to 20% $Ta_2O_5$; and 0 to 10% $GeO_2$.

The present invention provides a high-quality optical glass element with a high refractive index, low dispersion, and good shape precision.

[14] The optical glass element of the present invention is characterized in that in the optical glass element described in any one of [10] to [13], an antireflective film is present on the surface glass layer.

Since the surface glass layer comprised principally of $SiO_2$ of the optical glass element of the present invention is compatible with an antireflective film, the antireflective film tends not to peel off. In the present invention, since the surface glass layer is less than 5 nm in thickness, an antireflective effect can be achieved without nonuniformity.

Effect of the Invention

The present invention effectively suppresses the surface reaction that tends to occur in the course of press molding and permits the stable production with high yield of a high precision optical element. It also affords advantages in that deterioration of the pressing mold surface is suppressed, imparting a long service life. In particular, the press molding of an optical glass comprising readily reducing components or volatile components is extremely effective for manufacturing optical elements with high refractive indexes.

THE MODE IMPLEMENTING THE INVENTION

[The Glass Material]

Figure 1:
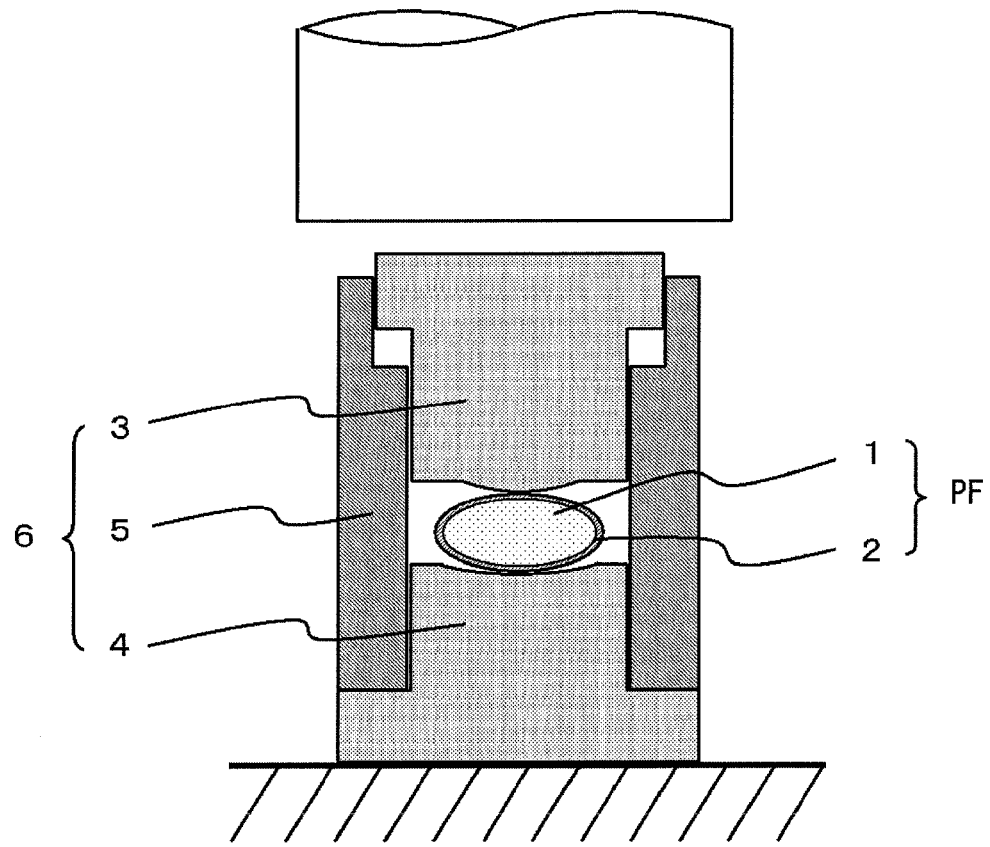
FIG. 1 A sectional view of one mode of press molding the glass material of the present invention.

The present invention relates to a glass material employed in press molding. The glass material is characterized by comprising a core member comprised of optical glass with a multiple component system and a surface glass layer covering at least an area that is to become an optically functional surface of the core member, and in that the surface glass layer comprises more than 90 mass % of $SiO_2$ and is less than 5 nm in thickness.

The surface glass layer provided in the glass material covers at least an area that is to become an optically functional surface of the core member comprised of an optical glass with a multiple component system. Surface glass layer 2 is formed in at least an area that is to become an optically functional surface of the optical element when the glass material is press molded, and desirably covers the entire surface of core member 1. With surface glass layer 2 covering at least an optically functional surface, it becomes possible to form a high precision optical element without losing surface precision or optical performance.

The surface glass layer that is provided on the glass material comprises more than 90 mass % of $SiO_2$. The surface glass layer is not crystalline, but is a layer of noncrystalline or amorphous $SiO_2$. When press molding is conducted with a glass material on which is formed a thin film of 90 mass % or less SiO2, moldability tends to be poorer than with a glass material on which is formed a surface glass layer 2 comprising more than 90 mass % of $SiO_2$. From the perspective of achieving good moldability, the content of $SiO_2$ desirably falls within a range of 95 to 99.9 mass %, preferably within a range of 98 to 99.99 mass %. Components such as $Al_2O_3$, CaO, $Fe_2O_3$, $K_2O$, MgO, and $Na_2O$ can be incorporated in addition to $SiO_2$. In the surface glass layer, depending on the formation method, there are sometimes cases were a slight oxygen deficiency in $SiO_2$ occurs or cases where the ratio of $SiO_2$ decreases due to diffusion of some of the core glass components. Even in such cases, the $SiO_2$ content will not drop below 90 mass %.

The surface glass layer that is provided on the glass material is less than 5 nm in thickness. The surface glass layer, the thickness of which is specified in the present invention, is a surface glass layer that covers an area that is to become an optically functional surface of the core member comprised of an optical glass with a multiple component system. When the surface glass layer is provided so as to cover the entire surface of the core member, although also depending on the method used to form the surface glass layer, there are sometimes cases where the surface glass layer thickness T1 in a spot that is to become an optically functional surface differs from the surface glass layer thickness T2 in a spot that is along the outer perimeter. The tendency is for T1 T2. In the present invention, attention is paid to the surface shape in areas that are to become optically functional surfaces. The film thickness that is specified in the present invention is T1. The film thickness can be measured by, for example, elemental analysis of the cross section of the glass material. Alternatively, it can be estimated based on sputtering conditions in cases where the surface glass layer is formed by sputtering. The thickness of the surface glass layer indicated in the embodiments is a value estimated based on sputtering conditions.

The lower limit of the thickness of the surface glass layer provided on the glass material is, for example, 1 nm. When the film thickness is less than 1 nm, the surface glass layer becomes a spotty coating, with gaps appearing in the film. Nor can the operating effect of the surface glass layer be adequately developed. The thickness of the surface glass layer provided on the glass material desirably falls within a range of 2 to 4 nm. The reasons for limiting the thickness of the surface glass layer that is provided on the glass material to less than 5 nm in the present invention are given below.

The optical glass with a multiple component system serving as the core member in the optical glass element and glass material of the present invention is not specifically limited. However, from the perspective of achieving a particularly pronounced effect in the present invention, the use of a glass that readily undergoes an interface reaction with the pressing mold during press molding is desirable. In particular, an optical glass element and glass material having a core member comprising an optical glass comprising at least one readily reducing component from among W, Ti, Bi, and Nb is suitable. Specific examples of such optical glasses will be given further below. These readily reducing components are incorporated into the glass to achieve high refractive index characteristics. When a glass material comprised of such an optical glass is employed in press molding, scratching and foaming tend to occur on the surface of the lens obtained by press molding. This has been attributed to a reaction occurring at the interface with the pressing mold during the pressing step due to the property of these components of readily undergoing reduction.

Figure 9:
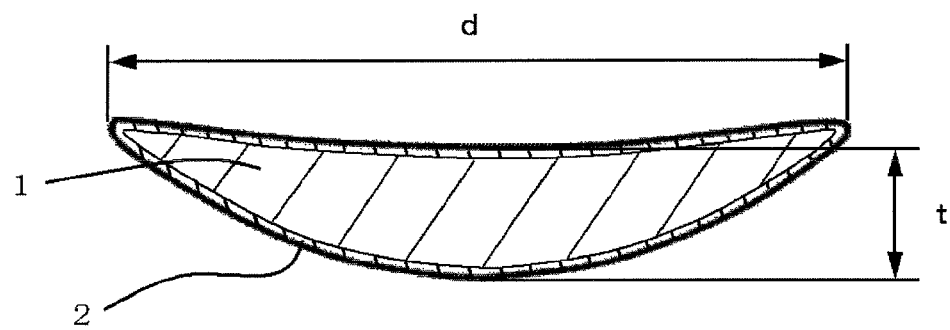
FIG. 9 A section view of one mode of the glass material for press molding of the present invention.

Accordingly, in the manufacturing of optical glasses that are relatively difficult to press mold, as shown in FIG. 9, the present inventors prepared multiple glass materials PF (also referred to simply as glass materials hereinafter) for press molding by coating a surface glass layer 2 comprised principally of silicon oxide ($SiO_2$), which tends not to undergo an interface reaction with the molding surface at high temperature, on the surface of a core member 1 comprised of an optical glass with a multiple component system while varying the thickness of surface glass layer 2, and press molded these glass materials with a pressing mold 6, as shown in FIG. 1.

The optical glass with a multiple component system was the glass of Embodiment 1 and comprised at least one of the readily reducing components of the group consisting of W, Ti, Bi, and Nb. This glass was preformed into a prescribed shape to obtain a glass material (core member 1). The surface thereof was coated with a glass film 2 comprising more than 90 mass % of $SiO_2$ to form the glass material PF. Glass film 2 was formed by sputtering using quartz glass ($SiO_2$) as a target. The composition was comprised of 99.2 mass % of $SiO_2$. Subsequently, glass material PF was heat softened and press molded in a pressing mold 6 comprised of an upper mold 3 having the molding surface, a lower mold 4, and a sleeve mold 5, which kept upper mold 3 and lower mold 4 concentric, as shown in FIG. 1. The details of the press molding conditions are given in the embodiments. In this process, seven glass materials were prepared with film thicknesses in the portions of the surface glass film positioned on optically functional surfaces of 1 nm, 3 nm, 4 nm, 5 nm, 6 nm, 9 nm, and 30 nm. Press molding was conducted with each of these under identical conditions.

The surfaces of the seven optical glass elements obtained by press molding were analyzed by electron microscopy. The images that were picked up are shown in FIGS. 2 to 8. In FIGS. 2 to 8, the thickness of the various glass surface layers 2 was 1 nm, 3 nm, 4 nm, 5 nm, 6 nm, 9 nm, and 30 nm, and the surface shapes of the optical glass elements that were press molded are given.

As shown in FIGS. 5 to 8, when surface glass layers 2 of 5 nm, 6 nm, 9 nm, and 30 nm were applied, the film thickness was 50 nm or less in all cases. However, minute cracks were found to appear in the lens surface following press molding. Clouding appeared on the surfaces of the lenses that were obtained by press molding glass materials PF with surface glass layer 2 coatings of 9 and 30 nm. Sites were also observed where the core glass seemed to have risen up and flowed out through minute cracks. Such cases where a surface glass layer 2 of 5 nm or more was formed were found to invite deterioration of the surface precision of the press molded article due to the difference in the thermal expansion coefficients of the core glass and the surface glass layer.

Patent Reference 1 describes that when a silicon oxide film exceeding 2,000 Angstroms (200 nm) in thickness was provided on the surface of the glass described in Patent Reference 1 (for example, a glass containing PbO), cracking tended to occur. Patent Reference 2 describes that when a film of primarily $SiO_2$ was provided on the surface of the glass described in Patent Reference 2 (for example, the optical glass SK12) to a thickness of 100 Angstroms (10 nm) or more, there was an anti-clouding effect. At 200 Angstroms (20 nm) or more, surface cracking occurred. Further, Patent Reference 3 describes that when a film of 70 to 90 wt % $SiO_2$ was provided on the surface of the glass described in Patent Reference 3 (for example, a heavy flint optical glass), cracks occurred at 50 nm and above. However, in the glass materials obtained by coating a glass film 2 comprising more than 90 mass % of $SiO_2$ (99.8 mass % in the experiments) on the surface of an optical glass (core member 1) with a multiple component system comprising at least one readily reducing component from among W, Ti, Bi, and Nb as set forth above, minute cracking occurred on the lens surface following press molding when glass film 2 was 5 nm or more in thickness. This phenomenon was unexpected based on the descriptions of Patent References 1 to 3.

Figure 2:
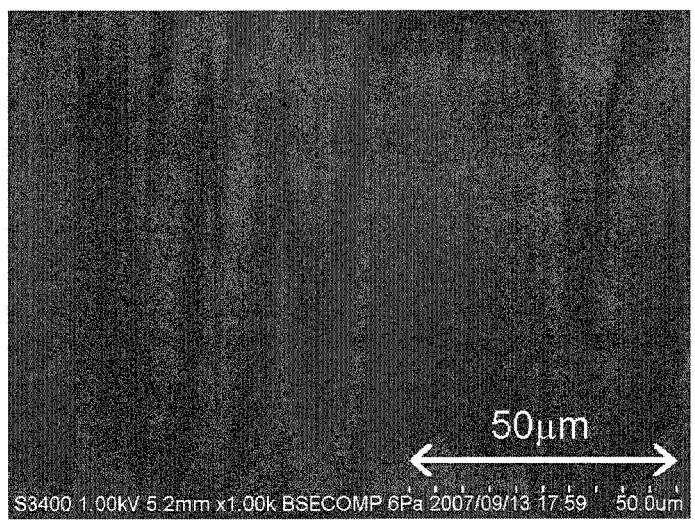
FIG. 2 An image taken by electron microscopy of the surface of the optical glass element of the present invention obtained by press molding a glass material having a surface glass layer 2 nm in thickness.
Figure 3:
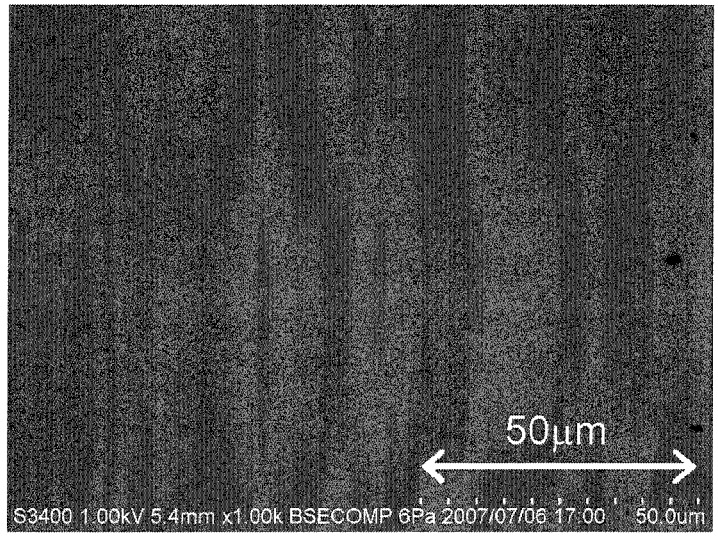
FIG. 3 An image taken by electron microscopy of the surface of the optical glass element of the present invention obtained by press molding a glass material having a surface glass layer 3 nm in thickness.
Figure 4:
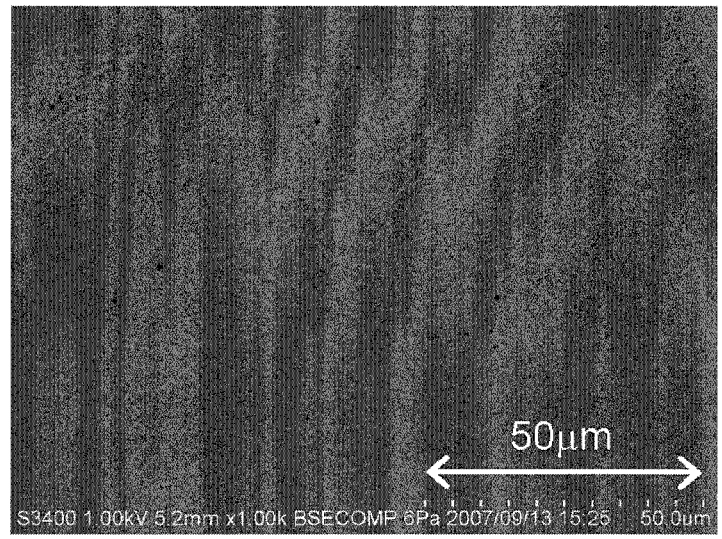
FIG. 4 An image taken by electron microscopy of the surface of the optical glass element of the present invention obtained by press molding a glass material having a surface glass layer 4 nm in thickness.
Figure 5:
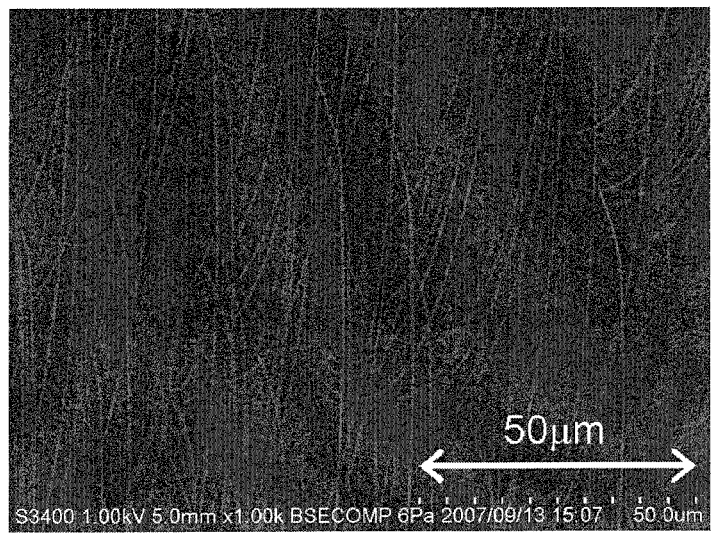
FIG. 5 An image taken by electron microscopy of the surface of the optical glass element obtained by press molding a glass material having a surface glass layer 5 nm in thickness.
Figure 6:
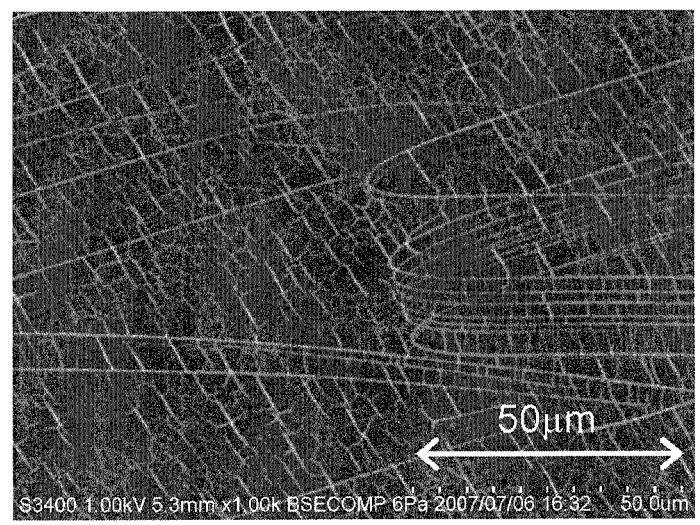
FIG. 6 An image taken by electron microscopy of the surface of the optical glass element obtained by press molding a glass material having a surface glass layer 6 nm in thickness.

By contrast, as shown in FIGS. 2 to 4, no minute cracking occurred, the optically functional surfaces were extremely smooth, and extremely good surface precision was achieved in optical lenses with lens surfaces obtained by coating surface glass layers 2 of less than 5 nm—1 nm, 3, nm, and 4 nm—and conducting press molding, which was considered to have no reaction-preventing effect in Patent References 1 to 3. Although there is no intent to adhere to any specific theory, it is thought that the softening point of the $SiO_2$ constituting surface glass layer 2 is much higher than the softening point of the glass components of core member 1 and thus surface glass layer 2 is not softened at pressing temperatures, but since it is extremely thin at a thickness of less than 5 nm, it becomes flexible (elastic), and follows deformation of the core glass without cracking and causing the surface glass layer to undergo plastic deformation.

In the above experiment, even though surface layer cracks were not found by optical microscopy or visual inspection in glass elements that were coated with 5 nm or more of glass material and press molded, as shown in the figures, minute reticulate cracks were observed upon analysis by electron microscopy. Aggregates of these minute cracks compromised the exterior appearance as clouding, and were thought to decrease the surface shape precision of aspherical surfaces and the like. By contrast, press molded optical elements with $SiO_2$ films of less than 5 nm exhibited good external appearance and shape precision without surface cracking. Accordingly, when even an optical glass comprised of a core member 1 tending to undergo a surface reaction during press molding was coated with a surface glass layer 2 of less than 5 nm and press molded, it was possible to suppress the reaction between the pressing mold and core member 1, effectively suppress fusion, and suppress the occurrence of cracking of surface glass layer 2. Thus, it was possible to stably produce high precision optical elements at high yields.

The core member of the configuration of the glass material of the present invention is comprised of an optical glass with a multiple component system. The optical glass with a multiple component system can, for example, be a glass comprising at least one readily reducing component from among W, Ti, Bi, and Nb. Examples of glasses comprising at least one readily reducing component from among W, Ti, Bi, and Nb will be described below for optical glasses I and II.

<Optical Glass I>

The glass of core member 1 (optical glass I) employed in the glass material and optical glass element of the present invention will be described below. In the present invention, an optical glass with a multiple component system comprising any of $WO_3$, $TiO_2$, $Bi_2O_3$, and $Nb_2O_5$ can be employed as core member 1. In particular, when the total quantity comprised is 5 mole % or more (for example, 10 to 65, preferably 15 to 55 mole %), the method of the present invention is particularly useful. The glass of core member 1 desirably comprises 3 more % or more of $WO_3$. For example, when it comprises 4 to 15 mole %, the effect of the present invention is pronounced.

For example, optical glass I can be an optical glass comprising, denoted as mole percentages: 10 to 45% $P_2O_5$, 3 to 35% $Nb_2O_5$, 2 to 35% $Li_2O$; 0 to 25% $TiO_2$; 0 to 20% $WO_3$; 0 to 40% $Bi_2O_3$; 0 to 20% $B_2O_3$; 0 to 25% BaO; 0 to 25% ZnO; 0 to 50% $Na_2O$; 0 to 20% $K_2O$; 0 to 15% $Al_2O_3$; and 0 to 15% $SiO_2$ (where the combined quantity of $WO_3$, $TiO_2$, $Bi_2O_3$, and $Nb_2O_5$ is not less than 10% but less than 65%).

The effect of the present invention is pronounced when optical glass I has a glass transition temperature Tg of 430° C. or higher, such as 450° C. or higher but not higher than 520° C. The effect of the present invention is also pronounced when the softening point of optical glass I is 530° C. or higher, such as 540° C. or higher but not higher than 600° C.

The above components will be specifically described below.

$P_2O_5$ is a glass network forming substance that imparts stability to the glass that permits manufacturing. When the content of $P_2O_5$ exceeds 45 mole %, weatherability deteriorates and maintaining a high refractive index tends to become difficult. At less than 10 mole %, the tendency of the glass to devitrify intensifies and the glass tends to become unstable. A range of 10 to 45 mole % is desirable, and a range of 15 to 35 mole % is preferred.

$Nb_2O_5$ imparts characteristics such as a high refractive index and high dispersion. When the quantity incorporated exceeds 35%, the glass transition temperature and the sag temperature rise, stability and high-temperature melting properties deteriorate, and foaming and coloration tend to occur during precision pressing. When the quantity introduced is less than 3%, the durability of the glass deteriorates and it becomes difficult to achieve the desired high refractive index. Thus, a range of 3 to 35% is desirable, and a range of 5 to 25% is preferred.

$Li_2O$ is an effective component for lowering the glass transition temperature. Compared to other alkalis, it has less of a tendency to lower the refractive index. When incorporated in a quantity of less than 2%, the transition temperature tends not to decrease. At more than 35%, the stability of the glass deteriorates and devitrification tends to occur. Thus, the quantity incorporated desirably falls within a range of 2 to 35%, preferably within a range of 3 to 25%.

$TiO_2$ imparts a high refractive index and high dispersion, and increases devitrification stability. When the quantity incorporated exceeds 25%, the devitrification stability and the transmittance of the glass tend to deteriorate, the sag temperature and the liquidus temperature tend to rise, and the glass tends to develop color during precision press molding. Thus, 0 to 25% is desirable and 0 to 15% is preferred.

$WO_3$ is an effective component in terms of imparting a high refractive index, high dispersion characteristics, and a low softening property. $WO_3$ functions to lower the glass transition temperature and sag temperature, and to raise the refractive index. Since it has the effect of suppressing the wettability of the glass and the pressing mold, it exhibits the effect of improving the mold release property of the glass during precision press molding. When an excessive quantity of $WO_3$ is incorporated, such as the incorporation of more than 20%, the glass tends to develop color and the high temperature viscosity of the glass tends to decrease. Thus, the hot molding of spherical glass becomes difficult. Accordingly, the content is desirably 0 to 20%, preferably falling within a range of 0 to 15%, and more preferably, falling within a range of 0 to 10%.

To suppress the tendency of high refractive index glass to crystallize, $WO_3$ is desirably introduced in a proportion of 1 mole % or more, for example 2 mole % or more. The introduction of 2 to 10 mole % is advantageous.

$Bi_2O_3$, a substitute for lead, is a component that imparts a high refractive index and high dispersion. It has the effects of greatly expanding the production range of the glass and stabilizing the glass. Accordingly, the introduction of $Bi_2O_3$ permits vitrification even in glasses with low $P_2O_5$ contents.

When the quantity introduced exceeds 40%, the glass tends to develop color. Thus, the content of $Bi_2O_3$ is desirably 0 to 40%, preferably 0 to 25%.

$B_2O_3$ is effective at enhancing the meltability of the glass and homogenizing the glass. At the same time, the incorporation of a small quantity changes the bond properties of OH within the glass, having the effect of suppressing foaming of the glass during precision press molding. When more than 20% of $B_2O_3$ is incorporated, the weatherability of the glass deteriorates and the glass tends to become unstable. Thus, 0 to 20% is desirable, and a range of 0 to 10% is preferred.

BaO is a component that has the effects of imparting a high refractive index, increasing devitrification stability, and lowering the liquidus temperature. When $WO_3$ is incorporated, particularly when $WO_3$ is incorporated in a large quantity, the introduction of BaO suppresses the development of color in the glass and has a considerable devitrification stabilizing effect. When the $P_2O_5$ content is low, the introduction of BaO has the effect of enhancing the weatherability of the glass. When the quantity of BaO that is introduced exceeds 25%, the glass becomes unstable and the transition temperature and sag temperature increase. Thus, BaO is desirably incorporated in a quantity of 0 to 25%, preferably 0 to 15%.

ZnO is a component that can be incorporated to raise the refractive index and dispersion of the glass. The incorporation of a small quantity of ZnO has the effects of lowering the glass transition temperature, the sag temperature, and the liquidus temperature. However, the introduction of an excessive amount results in pronounced deterioration of glass devitrification stability and presents a risk of raising the liquidus temperature. Accordingly, the quantity of ZnO incorporated is desirably 0 to 25%, preferably falling within a range of 0 to 15%, and more preferably, falling within a range of 0 to 10%.

$Na_2O$ and $K_2O$ are both components that can be incorporated to increase the resistance to devitrification of the glass, raise the glass transition temperature, sag temperature, and liquidus temperature, and enhance the meltability of the glass. However, when either $Na_2O$ or $K_2O$ exceeds 50%, or when the combined quantity of $Li_2O$, $Na_2O$, and $K_2O$ exceeds 55%, not only does the stability of the glass deteriorate, but there is a risk of the weatherability and durability of the glass deteriorating. Thus, the quantity of each of $Na_2O$ and $K_2O$ that is incorporated is 0 to 50%, desirably 0 to 20%, and the combined quantity of $Li_2O$, $Na_2O$, and $K_2O$ is desirably 0 to 55%. Preferred are 3 to 35% for $Na_2O$ and 0 to 10% for $K_2O$.

$Al_2O_3$ and $SiO_2$ are components that can be incorporated to adjust the stability and optical constants of the glass. However, these components also raise the glass transition temperature, and thus present a risk of compromising precision press moldability. They are each desirably kept to 15% or lower, preferably 0 to 10%.

MgO, CaO, and SrO are components that are incorporated to adjust the stability and weatherability of the glass. When incorporated in excessive quantities, the glass becomes unstable. Thus, they are each desirably incorporated in a quantity of 0 to 15%, preferably 0 to 10%.

$La_2O_3$, $Gd_2O_3$, $Yb_2O_3$, $ZrO_2$, and $Ta_2O_3$ are all components that can be incorporated to adjust the stability and optical constants of the glass. However, all of these components raise the glass transition temperature and thus present the risk of compromising precision press moldability. Accordingly, the quantity of each that is incorporated is desirably kept to 0 to 10%, preferably 0 to 8%.

To enhance the above properties while achieving the object of the present invention, the combined quantity of all of the above components and clarifying agents that are added desirably exceeds 95%, preferably exceeds 98%, more preferably exceeds 99%, and still more preferably, is 100%.

In addition to the above components, clarifying agents can be added in a ratio of 0 to 1 mass % based on the total content of the glass component. However, the addition of an excessive quantity of clarifying agent presents the risk of damaging the molding surfaces of the pressing mold, particularly the mold release film, during precision press molding. Thus, caution is warranted. Examples of clarifying agents are $Sb_2O_3$, $SnO_2$, $CeO_2$, $As_2O_3$ and the like. Out of concern for the impact on the environment, the use of $As_2O_3$ is to be avoided. $Sb_2O_3$ is desirably added in a quantity of 0 to 1 mass %. Although effective as a glass clarifying agent, when added in a quantity exceeding 1 mass %, $Sb_2O_3$ tends to cause foaming of the glass during press molding. Thus, the introduction of a quantity of 0 to 1 mass % is adequate. $SnO_2$ and $CeO_2$ can be simultaneously employed; the combined quantity thereof is desirably 0 to 2.5 mass %.

Other components such as $TeO_2$ and $Cs_2O$ can also be incorporated up to a combined quantity of 5% to the extent that the object of the present invention is not compromised. Since $TeO_2$ is toxic, it is desirably not employed out of concern for the environment. Similarly, $As_2O_3$, CdO, $Tl_2O$, radioactive substances, and compounds of Cr and Hg are also desirably not employed.

Because of its environmental impact and the fact that it is reduced during precision press molding in a non-oxidizing atmosphere and adheres to the molding surfaces of the pressing mold, PbO is also not incorporated. Except for cases where color is being imparted to the glass to impart a light-absorbing function at a specific wavelength, Cu, Fe, Cd, and the like are also desirably not incorporated.

The incorporation of F is possible. However, it volatizes from the glass in the course of molding the glass melt, generates striae, and causes variation in optical constants, and is thus desirably not incorporated.

Optical glass I of the above core member has a refractive index nd of 1.7 or higher; an Abbé number vd of 35 or lower, preferably 30 or lower, and more preferably, 25 or lower; and the like. It affords high refraction and high dispersion, and is thus a high value-added glass that is put to wide use. However, the components (W, Ti, Bi, Nb) that are incorporated to achieve such useful optical constants tend to be reduced and are highly reactive during the press molding process. That is, they tend to react at elevated temperatures at the interface of the glass surface and the molding surface of the pressing mold. As a result, clouding, scratching, and other reaction traces occur on the surface of the molded article that is obtained, and fusion to the molding surface tends to occur. Thus, an optical element of inadequate performance in terms of external appearance tends to be obtained.

<Optical Glass II>

The glass (optical glass II) of core member 1 that is employed in the glass material and optical glass element of the present invention will be described below.

In addition to incorporating at least one readily reducing component from among W, Ti, Bi, and Nb in the optical glass of core member 1 of the present invention, an optical glass comprising essential components in the form of $B_2O_3$, $La_2O_3$, and ZnO can also be adopted In optical glass II, $B_2O_3$ is a necessary component for constituting the glass network. $La_2O_3$ is an essential component for imparting a high refractive index and a low dispersion characteristic. When the two components are both present, the stability of the glass improves even more. ZnO is an essential component for imparting a low temperature softening property to the glass without lowering the refractive index.

By incorporating the above essential components in optical glass II, it is possible to impart optical characteristics in the form of a refractive index (nd) exceeding 1.7, desirably 1.8 or higher, and an Abbé number (vd) of 27 or higher, desirably 35 to 50. Specific examples are given below.

An optical glass comprising, denoted as mole percentages: 0 to 50% $SiO_2$; 5 to 70% $B_2O_3$; 0 to 20% $Li_2O$; 0 to 10% $Na_2O$; 0 to 10% $K_2O$; 1 to 50% ZnO; 0 to 10% CaO; 0 to 10% BaO; 0 to 10% SrO; 0 to 10% MgO; 5 to 30% $La_2O_3$, 0 to 22% $Gd_2O_3$; 0 to 10% $Yb_2O_3$, 0 to 15% $Nb_2O_5$; 0 to 20% $WO_3$, 0 to 40% $TiO_2$; 0 to 20% $Bi_2O_3$; 0 to 15% $ZrO_2$; 0 to 20% $Ta_2O_5$; and 0 to 10% $GeO_2$.

When the transition point Tg in optical glass II is 550° C. or higher, for example, 560° C. or higher but not higher than 630° C., the effect of the present invention is pronounced. The effect of the present invention is also pronounced when the softening point is 640° C. or higher, for example, 650° C. or higher but not higher than 720° C.

The various components of the above optical glass will be described.

$SiO_2$ functions to enhance the stability of the glass, but raises the glass transition temperature and lowers the refractive index when incorporated in excessive quantity. Accordingly, the quantity incorporated is set to 0 to 50%, desirably 0 to 40%, preferably 1 to 20%, and more preferably, 4 to 15%.

$B_2O_3$ is an essential component for network formation. However, when incorporated in excessive quantity, it lowers the refractive index (nd). It is thus incorporated in a proportion of 5 to 70%, desirably 10 to 65%, and preferably 20 to 55%.

$Li_2O$ has a major effect in lowering the glass transition temperature. However, when incorporated in excessive quantity, it lowers the refractive index and reduces glass stability. Accordingly, the quantity of $Li_2O$ is desirably 0 to 20%, preferably 0 to 15%. None can be incorporated at all. $Na_2O$ and $K_2O$ function to enhance meltability, but lower the refractive index and diminish stability when incorporated in excessive quantities. Thus, each is incorporated in a quantity of 0 to 10%, desirably 0 to 8%, and preferably 0 to 6%. They can be not incorporated at all.

ZnO is an essential component that maintains a high refractive index while imparting a low softening property. However, it lowers the stability of the glass when incorporated in excessive quantity. The quantity incorporated is thus 1 to 50%, desirably 3 to 45%, and preferably, 10 to 40%.

CaO, SrO, and MgO also function to improve meltability. However, they lower the refractive index and diminish glass stability when incorporated in excessive quantity. They are thus each incorporated in a quantity of 0 to 10%, desirably 0 to 8%, and preferably, 0 to 5%. BaO functions to raise the refractive index, but when incorporated in excessive quantity, diminishes the stability of the glass. The quantity incorporated is thus 0 to 10%, desirably 0 to 8%, and preferably, 0 to 5%.

$La_2O_3$ is an essential component imparting a high refractive index and a low dispersion characteristic. However, it lowers the stability of the glass when incorporated in excessive quantity. Thus, it is incorporated in a quantity of 5 to 30%, desirably 7 to 25%, and preferably, 9 to 18%.

$Gd_2O_3$ is a component that imparts a low dispersion characteristic. However, it diminishes the stability of the glass when incorporated in excessive quantity. It is thus incorporated in a quantity of 0 to 22%. When $Gd_2O$ and $La_2O_3$ are both present, an effect is achieved whereby the glass stability is increased relative to when only one of the two is incorporated. The quantity incorporated is desirably 0 to 20%, preferably 1 to 10%.

$Yb_2O_3$ is an optional component employed to raise the refractive index and lower dispersion. When incorporated in a small quantity, it increases the stability and chemical durability of the glass. However, when incorporated in excessive quantity, the stability of the glass relative to devitrification is greatly compromised, and the glass transition temperature and sag temperature increase. Thus, the quantity incorporated is 0 to 10%, desirably 0 to 8%.

$Nb_2O_5$ is also a component that raises the refractive index. However, when incorporated in excessive quantity, it diminishes the stability of the glass and raises the liquidus temperature. Thus, it is incorporated in a quantity of 0 to 15%, desirably 0 to 13%, and preferably, 0 to 7%.

$WO_3$ functions to raises the refractive index and increase the stability of the glass. However, when incorporated in excessive quantity, it diminishes the stability of the glass and discolors the glass. Accordingly, $WO_3$ is incorporated in a quantity of 0 to 20%, desirably 0 to 18%, and preferably, 1 to 13%.

$TiO_2$ is also a component that raises the refractive index. However, when incorporated in excessive quantity, it diminishes the stability of the glass and discolors the glass. It is thus incorporated in a quantity of 0 to 40%, desirably 0 to 35%, and preferably, 0 to 24%.

To raise the refractive index, the combined quantity of $WO_3$, $Ta_2O_5$, $Nb_2O_5$, and $TiO_2$ desirably exceeds 0.1 mole %, is preferably 1 mole % or higher, is more preferably 3 mole % or higher, and is still more preferably, is 5 mole % or higher.

When attempting to achieve a higher refractive index while satisfying the various conditions required of a glass with an Abbé number (vd) falling below 27, the molar ratio of the quantity of $B_2O_3$ to the combined quantity of $B_2O_3$ and $SiO_2$ ($B_2O_3/(B_2O_3+SiO_2)$) is desirably 0.50 to 1.00, preferably 0.60 to 0.95.

$Bi_2O_3$ functions to raise the refractive index and enhance the stability of the glass. However, when incorporated in excessive quantity, it imparts color to the glass and produces a problem in the form of corrosion of melting vessels made of platinum. Thus, the quantity incorporated is 0 to 20%, desirably 0 to 10%, and preferably, 0 to 5%.

$ZrO_2$ functions to increase the refractive resistance. However, when incorporated in excessive quantity, it diminishes the stability of the glass and increases the liquidus temperature. Thus, it is incorporated in a quantity of 0 to 15%, desirably 0 to 12%, and preferably, 1 to 6%.

To raise the refractive index while maintaining glass stability, the combined content of $WO_3$, $Ta_2O_5$, $Nb_2O_5$, $TiO_2$, and $ZrO_2$ is desirably 2 to 40 mole %, preferably 5 to 35 mole %.

$Ta_2O_5$ is an optional component used to raise the refractive index and lower dispersion. The incorporation of a small quantity of $Ta_2O_5$ has the effect of improving stability with respect to devitrification and high temperature viscosity without lowering the refractive index of the glass. However, when the quantity incorporated exceeds 20%, the liquidus temperature rises sharply and dispersion increases. Thus, the quantity incorporated is 0 to 20%, desirably 0 to 17%.

$GeO_2$ is an optional component that functions to raise the refractive index of the glass and increase the stability of the glass. The quantity incorporated is 0 to 10%, desirably 0 to 8%. However, it is more expensive than other components by a factor of 10, and is thus preferably not incorporated.

To enhance the above properties while achieving the object of the present invention, the combined quantity of all of the above components and clarifying agents that are added desirably exceeds 95%, preferably exceeds 98%, more preferably exceeds 99%, and still more preferably, is 100%.

In addition to the above components, clarifying agents can be added in a ratio of 0 to 1 mass % based on the total content of the glass component. However, the addition of an excessive quantity of clarifying agent presents the risk of damaging the molding surfaces of the pressing mold, particularly the mold release film, during precision press molding. Thus, caution is warranted. Examples of clarifying agents are $Sb_2O_3$, $SnO_2$, $CeO_2$, and $As_2O_3$. Out of concern for the impact on the environment, the use of $As_2O_3$ is to be avoided. $Sb_2O_3$ is desirably added in a quantity of 0 to 1 mass %. $SnO_2$ and $CeO_2$ can be simultaneously employed; the combined quantity thereof is desirably 0 to 2.5 mass %.

The incorporation of F is possible. However, it volatizes from the glass in the course of molding the glass melt, generates striae, and causes variation in optical constants, and is thus desirably not incorporated.

Because of its environmental impact and the fact that it is reduced during precision press molding in non-oxidizing atmospheres, adhering to the molding surfaces of the pressing mold, PbO is also not incorporated. Except for cases where color is being imparted to the glass to impart a light-absorbing function at a specific wavelength, Cu, Fe, Cd, and the like are also desirably not employed.

The shape of the core member of the glass material of the present invention is substantially identical to the shape of the glass material of the present invention because the surface glass layer covering the position that is to become an optically functional surface of the core member is less than 5 nm in thickness.

The glass material of the present invention desirably has a shape similar to the molded glass article (molded glass article molded by press molding) having a surface shape and center thickness identical to the optical glass element being targeted. The term shape similar to the molded glass article desirably means a rate of change in center thickness due to press molding to obtain an optical glass element of 50% or less and a rate of change in outside diameter of 50% or less. Here, the term rate of change is a ratio indicating how much the dimensions change following press molding relative to the dimensions prior to press molding, and can be calculated using the following computation equation (equation 1):

Rate of change (%)=|1−(dimension following press molding)/dimension prior to press molding)|×100

That is, the rate of change of the center thickness can be obtained from equation 2:

Rate of change of center thickness=|1−(center thickness of press molded article/center thickness of glass material)|×100

For example, for a center thickness of the glass material prior to press molding of 2.0 mm and a center thickness of the press molded article following pressing of 1.0 mm, equation 2 gives a rate of change in the center thickness of 50%.

The rate of change in the outside diameter can be calculated using equation 3:

Rate of change of outside diameter=|1−(outside diameter of press molded article/outside diameter of glass material)|×100

For example, for an outside diameter dimension of the glass material prior to press molding of 10.0 mm and an outside diameter dimension of the press molded article after pressing of 15.0 mm, equation 3 gives a range of change in outside diameter of 50%.

By limiting the similarly shaped glass material to a rate of change in center thickness when press molded of 50% or less and the rate of change of the outside diameter to 50% or less, as the amount of deformation of the glass material decreases, the amount of deformation of the surface glass layer decreases, and cracks do not occur in the surface glass layer when it is less than 5 nm thick.

The rate of change in the center thickness is desirably 40% or less, preferably 35% or less, and more preferably, 30% or less. However, when the rate of change of the center thickness is less than 1%, gas sometimes collects between the main surface of the similarly shaped glass material and the molding surface of the pressing mold and the surface precision of the press molded article sometimes deteriorates. Accordingly, the rate of change of the center thickness is 1% or more, desirably 5% or more. A desirable range of the rate of change in the center thickness is 5 to 40%, preferably 10 to 35%.

The rate of change of the outside diameter is desirably 30% or less, preferably 25% or less, and more preferably, 15% or less. However, when the rate of change of the outside diameter is less than 1%, gas sometimes collects between the main surface of the similarly shaped glass material and the molding surface of the pressing mold and the surface precision of the press molded article sometimes deteriorates. Accordingly, the rate of change of the outside diameter is 1% or more, desirably 3% or more. A desirable range of the rate of change in the center thickness is 3 to 30%, preferably 5 to 25%.

FIG. 9 is a sectional view of the glass material of the present invention. The glass material is a similarly shaped glass material that has been preformed to be similar to the molded glass article serving as the base for obtaining the final optical element. In FIG. 9, the letter d denotes the outer shape of the glass material and the letter t denotes the center thickness. The glass material is comprised of a core member 1 comprising the optical glass with a multiple component system such as optical glass I or optical glass II, and a surface glass layer 2 covering the surface of core member 1.

Figure 10:
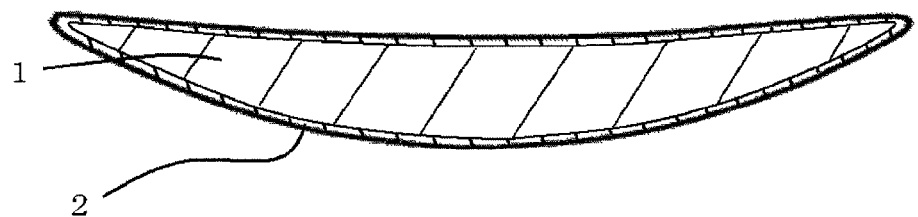
FIG. 10 A sectional view of a molded glass article press molded using the glass material for press molding shown in FIG. 9.

FIG. 10 is a sectional view of the molded glass article obtained by press molding the glass material of FIG. 9. Press molding causes the center thickness t to be smaller than that of the glass material and outside diameter d to be larger than that of the glass material. Surface glass layer 2 has been formed over the entire surface of the press molded article.

Preforming of the core member of the glass material of the present invention will be described next. The glass material of the present invention can be fabricated by using glass serving as core member 1 that has been preformed to a prescribed volume and shape. In this preforming, for example, a piece is cut from a block-shaped piece of optical glass, ground, and polished to preform it to a prescribed volume and shape. Alternatively, an optical glass melt can be dripped from a pipe, or separated while flowing down, to obtain a glass gob, and the glass gob can be preshaped while cooling. Here, the method of receiving the glass melt in receiving molds into which gas is being blown from beneath, and cooling and preforming the glass melts while they are in an substantially floating state can be adopted. This method is desirable because it affords good productivity and produces a glass material with a smooth surface.

The glass material of the present invention desirably has a shape similar to the molded glass article obtained by press molding. The core member 1 of the similarly shaped glass material is also desirably preformed to a shape similar to the molded glass article before it is coated with surface glass layer 2.

The core member 1 of the similarly shaped glass material can be molded by the following method, for example.

A glass melt is caused to flow out of a pipe and a glass melt gob is separated. While the glass melt gob that has been obtained is being supported by a lower mold having a lower mold molding surface, the upper surface of the glass melt is pressed by an upper mold having an upper mold molding surface of prescribed shape, and the glass is cooled while maintaining this state. Thus, the glass is molded to the shape of the molding surface of the upper and lower molds, and the core member 1 of the similarly shaped glass material is formed.

In addition to the above method, it is also possible for a glass material that has been molded in advance into a spherical shape or oblate spherical shape to be softened by reheating, and for the softened glass material to be molded into a shape similar to the targeted molded glass article using a pressing mold. Still further, it is possible for a block-shaped or plate-shaped glass material to be ground or polished to form the core member 1 of a similarly shaped glass material.

To obtain an optical glass element in the form of a meniscus lens, the similarly shaped glass material and its core member 1 desirably have a shape with a convex surface on one side and a concave or planar surface on the other side, with a convex surface on the other side being preferred. When molding a similarly shaped glass material and core member 1 with such a shape, in the pressing mold for molding the glass melt gob or softened glass material by the above method, the lower mold can have a concave molding surface and the upper mold can have a convex or planar molding surface. Press molding and cooling can be conducted as set forth above to form a similarly shaped glass material and its core member 1 of prescribed shape.

When obtaining an optical glass element in the form of a biconvex lens, the similarly shaped glass material and its core member 1 desirably have two surfaces that are convex in shape. Such a similarly shaped glass member and its core member 1 can be formed by employing a pressing mold in which both the lower mold and upper mold have concave molding surfaces to conduct press molding and cooling.

In the present invention, the surface of a preformed member comprised of optical glass with a multiple component system serving as a preformed core member 1 as set forth above is coated with a surface glass layer 2 comprised of $SiO_2$. A known film-forming method such as sputtering or vacuum vapor deposition can be employed as the coating method. For example, surface glass layer 2 can be formed on core member 1 by the sputtering method employing $SiO_2$ (quartz glass) as the target material and argon gas. Alternatively, surface glass layer 2 can be formed on core member 1 by the sputtering method employing Si (silicon) as the target material and argon gas and oxygen gas.

The following method can be employed as a specific film-forming method for surface glass layer 2. Multiple pieces of core glass (core member 1) that have been formed into prescribed shape are arranged on a tray and the tray is placed in a vacuum chamber. The interior of the vacuum chamber is evacuated to generate a vacuum while heating the core glass to about 300° C. with a heater. Once the interior of the vacuum chamber has been evacuated to the point where a degree of vacuum of $1 \times 10^{-5}$ Torr or less has been produced, Ar gas is introduced, the target material (quartz glass) within the vacuum chamber is subjected to a high frequency, the starting material is converted to a plasma, and an $SiO_2$ film is formed on the surface of the core glass. The thickness of surface glass layer 2 can be controlled as desired by adjusting the pressure (degree of vacuum) within the vacuum chamber, the power supply, and the film forming time.

Surface glass layer 2 need only be coated on the area of core member 2 in which the optically functional surface of the optical element will be formed when glass material PF is press-molded to mold an optical element. The term optically functional surface means the area within the effective diameter of an optical lens, for example.

Here, surface glass layer 2 comprises more than 90 mass % of SiO2, desirably 95 mass % or more of $SiO_2$, and preferably 98 mass % or more of SiO2. Components such as $Al_2O_3$, CaO, $Fe_2O_3$, $K_2O$, MgO, and $Na_2O$ can be comprised in addition to $SiO_2$. The composition of the surface glass layer can be measured by various elemental analysis methods such as ICP emission spectrophotometric analysis and X-ray fluorescence elemental analysis. By employing a target material in the form of quartz glass or silicon, it is possible to form a surface glass layer 2 comprising more than 90 mass % $SiO_2$. When employing quartz glass as the target material, the mass ratio of the $SiO_2$ in surface glass layer 2 will vary with the purity of the quartz glass. Even when conducting sputtering with a target in the form of commercial quartz glass, it is still possible to form an $SiO_2$ layer of 99 mass % or higher. In addition to employing an inert gas such as argon as the gas introduced during film forming (the sputtering gas), it is also possible to employ a mixed gas of argon (Ar) and oxygen ($O_2$) (with the quantity of Ar introduced being greater than or equal to the quantity of $O_2$ introduced). When employing silicon as the target material, the use of an introduction gas in the form of $O_2$ or a mixed gas of $O_2$ and Ar and the use of an oxygen-containing atmosphere as the sputtering atmosphere permit the formation of an $SiO_2$ film of 90 mass % or more SiO2.

A film containing carbon can be present on the surface (that is, the area beyond surface glass layer 2) of the glass material PF of the present invention. This imparts adequate smoothness to the pressing mold when the glass material is fed to the pressing mold before pressing, allows the glass material to smoothly migrate to a prescribed position (center position) of the pressing mold, and allows the surface of the glass material to extend as the glass deforms when the glass material softens and deforms due to pressing, aiding extension of the glass material along the surface of the pressing mold. This is also useful to facilitate separation of the glass from the surface of the pressing mold and mold release when the pressed article is cooled to a prescribed temperature after pressing.

The carbon-containing film is desirably mainly comprised of carbon. It can contain components other than carbon, such as in a hydrocarbon film. A known film forming method, such as vacuum vapor deposition, sputtering, ion plating, plasma treatment, and ion gun treatment employing a carbon starting material, can be employed as the film-forming method. The film can also be formed by thermal decomposition of a carbon-containing material such as a hydrocarbon.

[The Method for Manufacturing an Optical Glass Element]

The present invention includes a method for manufacturing an optical glass element by heat softening a glass material PF that has been preformed to a prescribed shape and conducting press molding using pressing mold 6. The above-described glass material of the present invention is employed in the method for manufacturing an optical glass element.

The press molding method will be described. A pressing mold 1 that has been obtained by precisely processing a close material having adequate heat resistance and rigidity can be employed in press molding. Examples are silicon carbide, silicon nitride, tungsten carbide, aluminum oxide, titanium carbide, stainless steel, and other metals, as well as these same materials with surfaces that have been coated with films of carbon, heat-resistant metals, noble metal alloys, carbide, nitride, boride compounds, or the like.

A carbon-containing film is desirable from the perspective of being able to mold the glass material of the present invention having a surface glass layer comprising more than 90 mass % of $SiO_2$ and less than 5 nm in thickness into an optical glass element free of fusion, clouding, scratching, and the like. A carbon-containing film that is comprised of amorphous and/or crystalline, graphite and/or diamond, a single component layer or a composite layer, is desirably employed. The carbon film can be formed by sputtering, plasma CVD, CVD, ion plating, or the like. For example, the film can be formed by sputtering employing an inert gas such as Ar as the sputtering gas and graphite as the sputtering target. Alternatively, the film can be formed by microwave plasma CVD using methane gas as the starting material gas. When forming the film by the ion plating method, benzene gas can be ionized for use. These carbon films include those having C—H bonds.

Providing a carbon-containing mold release film on the molding surface of the pressing mold or forming a carbon-containing film on the surface of the glass material has a certain effect in preventing fusion. In such cases, to prevent oxidation of the carbon during press molding, it is desirable to conduct pressing in a non-oxidizing atmosphere. However, the above readily reducing components tend to reduce under a non-oxidizing atmosphere. Thus, there is a problem in that interface reactions tend to take place between the glass and the carbon. Since a glass material is employed in the present invention in which the glass of the core member is surface coated with a surface glass layer comprising more than 90 mass % of $SiO_2$ and less than 5 nm in thickness, for example, an advantage is afforded in that the interface reaction between the glass and carbon can be suppressed even when pressing is conducted in a non-oxidizing atmosphere such as nitrogen gas.

Press molding can be conducted by the following methods, for example.

In press molding, as shown in FIG. 1, a glass material PF is fed into a pressing mold 6 comprising an upper mold 3, a lower mold 4, and a sleeve mold 5 and heated to within a temperature range suited to pressing. For example, the heating temperature is suitably set based on the optical glass of core member 1. However, press molding is desirably conducted within a temperature range at which the viscosity of the glass material PF becomes $10^5$ to $10^{10}$ dPa·s. The pressing temperature desirably corresponds to a viscosity of $10^{7.2}$ dPa·s of the optical glass constituting core member 1, for example. Making the temperature corresponding to a viscosity of around $10^{7.2}$ dPa·s of core member 1800° C. or lower, desirably 750° C. or lower, and more preferably, 650° C. or lower serves as a selection index for the glass. In particular, it is suitable to set the above press molding temperature condition in a manner taking into account the fact that the glass material of the present invention having a surface glass layer that comprises more than 90 mass % of $SiO_2$ and is less than 5 nm in thickness is employed in the present invention, the fact that the melting point of the surface glass layer is higher than that of the glass of the core member, and the fact that the surface glass layer deforms to a certain degree during press molding (which is relatively easy because it is extremely thin).

The glass material PF can be fed into pressing mold 6 and both glass material PF and pressing mold 6 heated to the above temperature range, or glass material PF and pressing mold 6 can be separately heated to the above temperature range and glass material PF positioned within pressing mold 6. A method in which glass material PF is heated to a temperature corresponding to a viscosity of $10^5$ to $10^9$ dPa·s, pressing mold 6 is separately heated to a temperature corresponding to a glass viscosity of $10^9$ to $10^{12}$ dPa·s, glass material PF is positioned in pressing mold 6, and press molding is immediately conducted can also be employed. This is desirable in that effects are achieved in that the pressing mold temperature can be relatively low, the cycle time for heating/cooling the molding apparatus can be shortened, and deterioration of pressing mold 6 due to heating can be suppressed. In either case, cooling is begun at the start of press molding or after it has started, and the molding surface and glass element are kept in close contact while a suitable load application schedule is applied and the temperature is lowered. Subsequently, the molds are released and the molded article is removed. The mold release temperature is desirably one that corresponds to a viscosity of $10^{12.5}$ to $10^{13.5}$ dPa·s.

[The Optical Glass Element]

The present invention includes an optical glass element that is manufactured by press molding the glass material PF of the present invention. The optical glass element of the present invention is characterized by being a press molded optical glass element, by comprising a core member comprised of an optical glass with a multiple component system and a surface glass layer covering at least the optically functional surface of the core member, and in that the surface glass layer comprises more than 90 mass % of $SiO_2$ and is less than 5 nm in thickness.

The composition of the core member and surface glass layer comprised of optical glass that constitute the optical glass element of the present invention are identical to the glass material of the present invention. The thickness of the surface glass layer substantially does not change due to press molding. This tendency is particularly pronounced when the glass material is of a shape similar to that of the molded glass article that is obtained by press molding, particularly when the shape is such that the rate of change of the center thickness due to press molding is 50% or less and the rate of change of the outside diameter is 50% or less. The thermal expansion coefficient of the surface glass layer is lower than that of the core glass and its glass transition temperature is higher than that of the core glass (it has less of a tendency to thermally deform at the pressing temperature (tends not to extend)). Thus, even when the glass material PF at ordinary temperature is heated to the pressing temperature, press molded, and then cooled to ordinary temperature following press molding, the thickness of the surface glass layer does not change from the glass material to the optical glass element following press molding.

Since a $SiO_2$ film, albeit thin, is present on the surface of the optical glass element of the present invention, the $SiO_2$ content is high. Thus, the optical glass element has the characteristic of good chemical durability.

An optically functional film such as an antireflective film can be formed on the surface of the optical glass element of the present invention. In that case, a single layer or laminated layers of materials such as $Al_2O_3$, $ZrO_2$—$TiO_2$, and $MgF_2$ can be suitably formed on the molded article in which the surface glass layer is present to obtain a desired antireflective film. The antireflective film can be formed by a known method such as vapor deposition, ion-assisted vapor deposition, ion plating, or sputtering.

For example, in the case of vapor deposition, a vapor deposition apparatus is used to heat a vapor deposition material with an electron beam, the direct passage of electricity, or an arc in a vacuum atmosphere of around $10^{-4}$ Torr, and vapor from the material that has been generated by evaporation and sublimation is transmitted to the substrate, where it condenses and precipitates to form an antireflective film. The substrate can be heated to a temperature of from room temperature to about 400° C. However, when the glass transition temperature (Tg) of the substrate is 450° C. or lower, the upper limit heating temperature of the substrate can be set to Tg-50° C.

Figure 11:
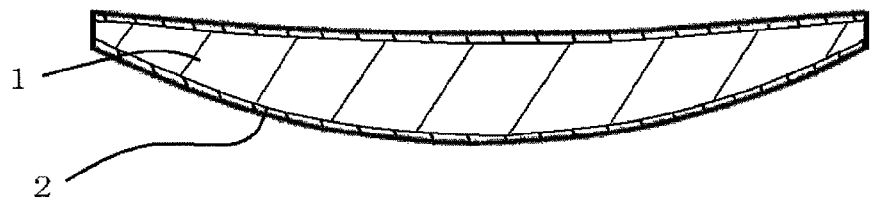
FIG. 11 A sectional view of an optical glass element obtained from the molded glass article shown in FIG. 10.

The optical glass element of the present invention comprises a surface glass layer comprised principally of $SiO_2$. The surface glass layer is highly compatible with antireflective films. Thus, antireflective films tend not to peel off. Since the surface glass layer present in the optical glass element is less than 5 nm in thickness in the present invention, an antireflective film can be applied without nonuniformity. By contrast, were an optical glass element to be obtained by press molding a glass material with a thick surface glass layer, the difference in thickness of the surface glass layer at the center and periphery would be large. Were an antireflective film to be applied, there would be nonuniformity due to the antireflection effect.

was molded as shown in FIG. 11. Surface glass layer 2 was 99.2 mass % $SiO_2$ (remainder impurities).

First optical glass I serving as core member 1 was dripped onto receiving molds while in a molten state, cooled, and preformed into glass gobs with a shape having a convex surface on one side and a concave surface on the reverse side, as shown in FIG. 9. Next, sputtering employing quartz glass ($SiO_2$) as target was used to form a surface glass layer 2 of prescribed thickness (2, 3, 4 nm) on the surface of the glass gobs that had been preformed, yielding a glass material PF for press molding. The prescribed thickness was estimated from the sputtering conditions. The glass material PF had a shape similar to that of the molded glass article (see FIG. 10) shown in FIG. 9. The outside diameter dimension d was 17.6 mm and the center thickness t was 3.24 mm.

TABLE 1

|  | Unit | Embodiment | | | | | |
| --- | --- | --- | --- | --- | --- | --- | --- |
|  |  | 1 mol % | 2 mol % | 3 mol % | 4 mol % | 5 mol % | 6 mol % |
| B2O3 |  | 2.00 | 2.00 | 6.00 | 6.00 | 3.40 | 4.70 |
| P2O5 |  | 25.50 | 25.50 | 24.00 | 24.00 | 23.70 | 27.10 |
| Al2O3 |  | 0 | 0 | 0 | 0 | 0 | 1.80 |
| Li2O |  | 6.00 | 16.00 | 20.50 | 20.00 | 19.20 | 9.80 |
| Na2O |  | 10.50 | 10.50 | 12.00 | 13.00 | 11.20 | 29.10 |
| K2O |  | 2.00 | 2.00 | 2.00 | 2.00 | 2.00 | 0 |
| BaO |  | 1.00 | 1.00 | 1.00 | 2.00 | 7.90 | 0 |
| ZnO |  | 0 | 0 | 1.00 | 2.00 | 2.90 | 4.70 |
| TiO2 |  | 7.00 | 7.00 | 5.50 | 5.00 | 5.90 | 5.70 |
| Nb2O3 |  | 18.00 | 18.00 | 19.00 | 18.00 | 16.20 | 10.10 |
| WO3 |  | 8.00 | 8.00 | 5.00 | 5.00 | 7.60 | 5.80 |
| Bi2O3 |  | 20.00 | 10.00 | 4.00 | 3.00 | 0 | 0 |
| Ti + Nb + W + Bi |  | 53.00 | 43.00 | 33.50 | 31.00 | 29.70 | 21.60 |
| Total |  | 100 | 100 | 100 | 100 | 100 | 100 |
| Refractive index |  | 2.0031 | 1.9208 | 1.84976 | 1.82732 | 1.80558 | 1.6875 |
| Abbé number |  | 19.1 | 20.8 | 22.96 | 23.92 | 25.46 | 31.40 |
| Tg (° C.) |  | 488 | 471 | 455 | 450 | 466 | 455 |
| Ts (° C.) |  | 537 | 522 | 507 | 503 | 517 | 500 |

FIG. 11 shows a sectional view of the optical glass element of the present invention. The targeted optical element shown in FIG. 11 was obtained by edge processing (grinding) the peripheral portion of the molded glass article shown in FIG. 10. Surface glass layer 2 has also been removed from the peripheral edge surface that has been edge processed and ground.

The shape of the optical glass element of the present invention is not limited. It can applied to various shapes, such as convex meniscus lenses, concave meniscus lenses, biconvex lenses, and biconcave lenses.

The optical glass element of the present invention can be employed as small-diameter, thin, lightweight lenses such as the lenses used in small image pickup systems that are installed in portable image pickup devices, communication lenses, optical pickup object lenses, and collimator lenses.

[Embodiments]

Embodiments of the present invention will be described in detail below.

Embodiments 1 to 6

The six types of optical glass falling under optical glass I that are listed in Table 1 were employed as the optical glass of core member 1 of a glass material PF. The surface thereof was coated with a surface glass layer 2 of less than 5 nm in thickness comprising more than 90% of $SiO_2$ to obtain a glass material PF, and a glass lens of convex meniscus shape with a lens diameter of 18 mm and a center thickness of 2.65 mm In the table, Tg denotes the glass transition temperature and Ts denotes the sag temperature.

Next, the above glass material PF was press molded in a nitrogen gas atmosphere with a press molding apparatus. That is, a press mold comprised of upper and lower molds of SiC with molding surfaces on which a carbon-containing mold release film had been formed by sputtering and a sleeve mold was employed. The atmosphere within the chamber of the molding apparatus was backfilled with non-oxidizing $N_2$ gas, the glass material was heated to a temperature corresponding to a core glass viscosity of $10^{7.2}$ dPa·s, and the glass material was fed into the pressing mold that had been heated to a temperature corresponding to a core glass viscosity of $10^{8.5}$ dPa·s. The glass material was then pressed between the upper and lower molds immediately after having been introduced, the glass was cooled to a temperature below the cooling temperature of the core glass while maintaining the glass in tight contact with the upper and lower molds, and the molded article (optical lens) was removed from the pressing mold. The sectional shape of the molded article is shown in FIG. 10. Its outside diameter dimension d was 21.5 mm and its center thickness was 2.65 mm. That is, the rate of change in the outside diameter of the pressing mold was 22.2%, and the rate of change in the center thickness was 18.2%.

Next, the peripheral portion of the press molded article was edge processed by grinding, yielding a convex meniscus aspherical glass lens 18 mm in diameter.

For example, when the glass of Embodiment 1 was employed in the core member, surface glass layer 2 remaining on the surface of the molded article after press molding exhibited a good surface state with no cracking, scratching, or other surface defects in any of the molded articles, as shown in FIGS. 2 to 4. Even when press molding was continuously conducted for 200 shots, no pullout or fusion occurred on the molding surfaces of the pressing mold. The shape precision, eccentricity precision, and external appearance of the press molded article were all within specifications.

Glass materials PF for press molding in which surface glass layers were formed on glass core 1 by varying the thickness of the surface glass layer in four patterns of 5 nm, 6 nm, 9 nm, and 30 nm were employed as comparative examples. The various glass material PFs were press molded under the same press molding conditions as in the above embodiment.

Figure 7:
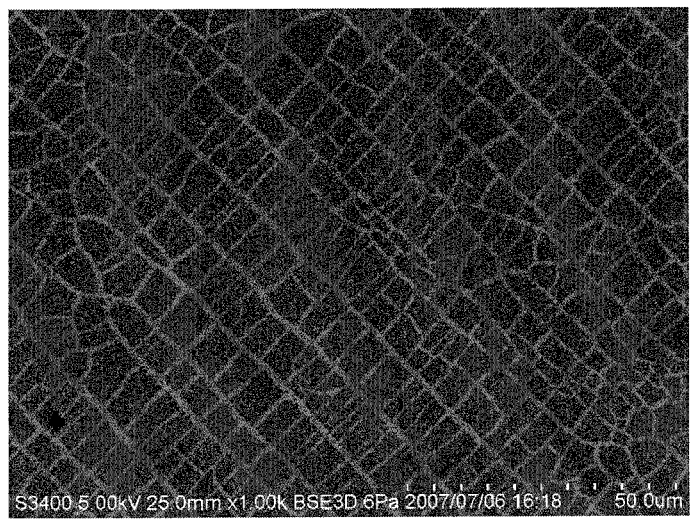
FIG. 7 An image taken by electron microscopy of the surface of the optical glass element obtained by press molding a glass material having a surface glass layer 9 nm in thickness.
Figure 8:
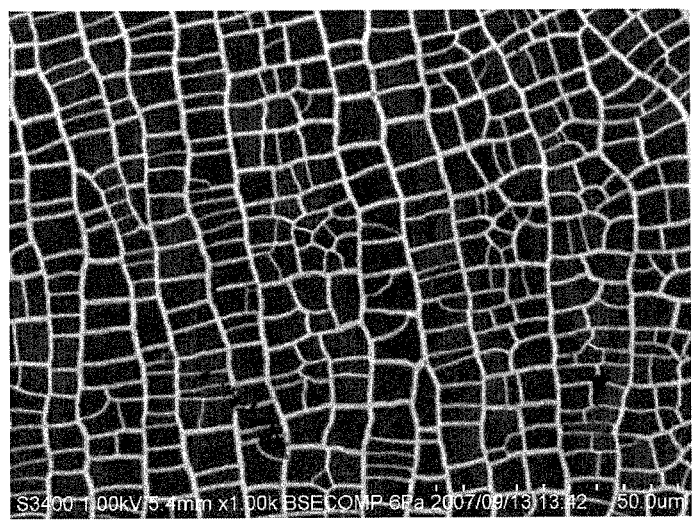
FIG. 8 An image taken by electron microscopy of the surface of the optical glass element obtained by press molding a glass material having a surface glass layer 30 nm in thickness.

For example, when the glass of Embodiment 1 was employed in the core member, surface glass layer 2 remaining on the surface of the molded article after press molding exhibited surface defects such as cracking and scratching in all of the molded articles as shown in FIGS. 5 to 8. The surface state was such that the optical elements could not be used. Clouding occurred and spots were observed in which the core glass flowed out through minute cracks on the surfaces of lenses that were obtained by press molding glass material PF that had been coated with 9 nm or 30 nm surface glass layers 2, as shown in FIGS. 7 and 8. In particular, in the course of press molding the glass material PF the surface of which was coated with a surface glass layer of 30 nm, fusion between the glass material PF and the pressing mold immediately following the start of press molding precluded subsequent press molding.

Embodiments 7 to 18

The 12 types of optical glass falling under optical glass II that are listed in Table 2 were employed as the optical glass of core member 1 of a glass material PF. The surface thereof was coated with a surface glass layer 2 of less than 5 nm in thickness comprising more than 90% of $SiO_2$ to obtain a glass material PF, and a glass lens of convex meniscus shape with a lens diameter of 16 mm was molded.

First optical glass II serving as core member 1 was dripped into receiving molds while in a molten state, cooled, and preformed into glass gobs with a shape having a convex surface on one side and a concave surface on the reverse side in the same manner as in Embodiments 1 to 6. Next, sputtering employing quartz glass ($SiO_2$) as target was used to form a surface glass layer 2 of prescribed thickness (2, 3, 4 nm) on the surface of the glass gobs that had been preformed, yielding a glass material PF for press molding. The prescribed thickness was estimated from the sputtering conditions. The glass material PF had a shape similar to that of the molded glass article (see FIG. 10) shown in FIG. 9. The outside diameter dimension d was 15.6 mm and the center thickness t was 2.98 mm.

TABLE 2

| Unit | Embodiment | | | | | |
|---|---|---|---|---|---|---|
| | 7 mol % | 8 mol % | 9 mol % | 10 mol % | 11 mol % | 12 mol % |
| $SiO_2$ | 4.95 | 11.48 | 5.06 | 6.40 | 7.81 | 6.27 |
| $B_2O_3$ | 51.28 | 39.87 | 43.04 | 37.60 | 35.39 | 35.13 |
| $Li_2O$ | 3.04 | 5.54 | 2.53 | 4.80 | 3.14 | 5.18 |
| ZnO | 15.44 | 20.12 | 17.72 | 22.4 | 31.72 | 31.37 |
| $La_2O_3$ | 10.63 | 9.52 | 13.50 | 13.6 | 12.24 | 12.39 |
| $Gd_2O_3$ | 8.63 | 7.39 | 6.33 | 0 | 0 | 0 |
| $ZrO_2$ | 5.38 | 4.02 | 5.06 | 4.80 | 3.81 | 2.82 |
| $Ta_2O_5$ | 0.65 | 1.81 | 3.38 | 0 | 1.06 | 2.90 |
| $TiO_2$ | 0 | 0 | 0 | 4.80 | 0 | 0 |
| $Nb_2O_3$ | 0 | 0 | 0 | 4.00 | 2.3 | 1.25 |
| $WO_3$ | 0 | 0.25 | 3.38 | 1.60 | 2.53 | 2.67 |
| $Bi_2O_3$ | 0 | 0 | 0 | 0 | 0 | 0 |
| $Sb_2O_3$ | 0 | 0 | 0 | 0 | 0 | 0.02 |
| Total | 100 | 100 | 100 | 100 | 100 | 100 |
| Refractive index | 1.76843 | 1.77325 | 1.82225 | 1.83390 | 1.80650 | 1.80921 |
| Abbé number | 49.54 | 47.33 | 42.78 | 37.24 | 40.6 | 40.91 |
| Tg (° C.) | 593 | 569 | 593 | 546 | 545 | 547 |
| Ts (° C.) | 635 | 615 | 640 | 598 | 580 | 589 |

| Unit | Embodiment | | | | | |
|---|---|---|---|---|---|---|
| | 13 mol % | 14 mol % | 15 mol % | 16 mol % | 17 mol % | 18 mol % |
| $SiO_2$ | 14.49 | 6.36 | 7.69 | 7.63 | 7.63 | 7.51 |
| $B_2O_3$ | 21.74 | 34.18 | 29.23 | 29.01 | 29.01 | 28.57 |
| $Li_2O$ | 5.8 | 0 | 0.77 | 0 | 0 | 0 |
| ZnO | 15.94 | 28.14 | 24.62 | 26.72 | 27.48 | 27.07 |
| $La_2O_3$ | 14.49 | 14.63 | 16.15 | 16.03 | 15.27 | 15.04 |
| $Gd_2O_3$ | 0 | 4.05 | 3.85 | 3.82 | 4.58 | 4.51 |
| $ZrO_2$ | 4.35 | 4.45 | 4.62 | 3.82 | 3.05 | 6.02 |
| $Ta_2O_5$ | 0 | 4.69 | 3.85 | 3.82 | 3.82 | 2.26 |
| $TiO_2$ | 20.29 | 0 | 1.54 | 1.53 | 0 | 3.20 |
| $Nb_2O_3$ | 2.9 | 0 | 0 | 0 | 0 | 0 |
| $WO_3$ | 0 | 3.50 | 7.69 | 7.63 | 9.16 | 4.15 |
| $Bi_2O_3$ | 0 | 0 | 0 | 0 | 0 | 1.32 |
| $Sb_2O_3$ | 0 | 0 | 0 | 0 | 0 | 0 |
| Total | 100 | 100 | 100 | 100 | 100 | 100 |
| Refractive index | 1.91949 | 1.8517 | 1.88297 | 1.88122 | 1.87770 | 1.88159 |

TABLE 2-continued

| Abbé number | 30.01 | 40.2 | 37.01 | 36.96 | 37.2 | 37.2 |
|---|---|---|---|---|---|---|
| Tg (° C.) | 564 | 604 | 608 | 615 | 605 | 605 |
| Ts (° C.) | 619 | 650 | 650 | 658 | 653 | 653 |

Next, glass material PF was press molded in the same manner as in Embodiments 1 to 6 with a press molding apparatus. FIG. 10 shows the sectional shape of the molded article. The outside diameter dimension d was 18.2 mm and the center thickness was 2.20 mm. That is, the rate of change in the outside diameter due to press molding was 16.7%, and the rate of change in the center thickness was 26.2%. Next, the peripheral portion of the press molded article was edge processed by grinding, yielding aspherical glass lenses of convex meniscus shape 16 mm in diameter.

The surface glass layer 2 remaining on the surface of the molded article following press molding exhibited a good surface state with no cracking, scratching, or other surface defects in any of the molded articles. Even when press molding was continuously conducted for 200 shots, no pullout or fusion occurred on the molding surfaces of the pressing mold. The shape precision, eccentricity precision, and external appearance of the press molded article were all within specifications.

[Key to the Numbers]

| 1 | Core member |
| 2 | Surface glass layer |
| 3 | Upper mold |
| 4 | Lower mold |
| 5 | Sleeve mold |
| 6 | Pressing mold |
| PF | Glass material for press molding |
| d | Outside diameter dimension |
| t | Center thickness |

The invention claimed is:

1. A glass material for press molding characterized by having a core member comprised of an optical glass with a multiple component system and a surface glass layer covering at least an area of the core member that is to become an optically functional surface, and in that the core member is comprised of an optical glass comprising at least one readily reducing component from the group consisting of W, Ti, B, and Nb, and not comprising Pb, the surface glass layer comprises more than 98 mass % of $SiO_2$ and is 1 nm or greater and less than 5 nm in thickness.

2. The glass material for press molding according to claim 1 characterized in that the core member is an optical glass comprising, denoted as mole percentages: 10 to 45% $P_2O_5$, 3 to 35% $Nb_2O_5$, 2 to 35% $Li_2O$; 0 to 25% $TiO_2$; 0 to 20% $WO_3$; 0 to 40% $Bi_2O_3$; 0 to 20% $B_2O_3$; 0 to 25% BaO; 0 to 25% ZnO; 0 to 50% $Na_2O$; 0 to 20% $K_2O$; 0 to 15% $Al_2O_3$; and 0 to 15% $SiO_2$, wherein the combined quantity of $WO_3$, $TiO_2$, $Bi_2O_3$, and $Nb_2O_5$ is not less than 10% but less than 65%.

3. The glass material for press molding according to claim 2 characterized in that the core member is an optical glass comprising 3 to 40% $Bi_2O_3$.

4. The glass material for press molding according to claim 1 characterized in that the core member is an optical glass comprising, denoted as mole percentages: 0 to 50% $SiO_2$; 5 to 70% $B_2O_3$; 0 to 20% $Li_2O$; 0 to 10% $Na_2O$; 0 to 10% $K_2O$; 1 to 50% ZnO; 0 to 10% CaO; 0 to 10% BaO; 0 to 10% SrO; 0 to 10% MgO; 5 to 30% $La_2O_3$; 0 to 22% $Gd_2O_3$; 0 to 10% $Yb_2O_3$, 0 to 15% $Nb_2O_5$; 0 to 20% $WO_3$, 0 to 40% $TiO_2$; 0 to 20% $Bi_2O_3$; 0 to 15% $ZrO_2$; 0 to 20% $Ta_2O_5$; and 0 to 10% $GeO_2$.

5. The glass material for press molding according to claim 1 characterized in that the glass material has a shape close to that of the glass molded article that is obtained by press molding.

6. The glass material for press molding according to claim 5 characterized in that the glass material with a shape close to that of the molded glass article has a shape such that the rate of change in center thickness due to press molding is 50% or less and the rate of change in the outside diameter due to press molding is 50% or less.

7. The glass material for press molding according to claim 1 characterized in that the glass material has a convex surface on one side and a concave surface on the reverse side.

8. A method for manufacturing an optical glass element characterized in that the glass material described in claim 1 is heated and the softened glass material is press molded in a pressing mold to obtain an optical glass element.

9. The method for manufacturing an optical glass element according to claim 8, wherein the pressing mold has a carbon-containing mold release film.

10. An optical glass element characterized by being a press molded optical glass element comprising a core member comprised of optical glass with a multiple component system comprising at least one readily reducing component selected from among W, Ti, Bi, and Nb and comprises no Pb and a surface glass layer covering at least an optically functional surface of the core member, and in that the surface glass layer comprises more than 98 mass % of $SiO_2$ and is 1 nm or greater and less than 5 nm in thickness.

11. The optical glass element according to claim 10 characterized in that the core member is an optical glass comprising, denoted as mole percentages: 10 to 45% $P_2O_5$, 3 to 35% $Nb_2O_5$, 2 to 35% $Li_2O$; 0 to 25% $TiO_2$; 0 to 20% $WO_3$; 0 to 40% $Bi_2O_3$; 0 to 20% $B_2O_3$; 0 to 25% BaO; 0 to 25% ZnO; 0 to 50% $Na_2O$; 0 to 20% $K_2O$; 0 to 15% $Al_2O_3$; and 0 to 15% $SiO_2$, wherein the combined quantity of $WO_3$, $TiO_2$, $Bi_2O_3$, and $Nb_2O_5$ is not less than 10% but less than 65%.

12. The optical glass element according to claim 11 characterized in that an antireflective film is present on the surface glass layer.

13. The optical glass according to claim 11 characterized in that the core member is an optical glass comprising 3 to 40% $Bi_2O_3$.

14. The optical glass element according to claim 13 characterized in that an antireflective film is present on the surface glass layer.

15. The optical glass element according to claim 10 characterized in that the core member is an optical glass comprising, denoted as mole percentages: 0 to 50% $SiO_2$; 5 to 70% $B_2O_3$; 0 to 20% $Li_2O$; 0 to 10% $Na_2O$; 0 to 10% $K_2O$; 1 to 50% ZnO; 0 to 10% CaO; 0 to 10% BaO; 0 to 10% SrO; 0 to 10% MgO; 5 to 30% $La_2O_3$; 0 to 22% $Gd_2O_3$; 0 to 10% $Yb_2O_3$, 0 to 15% $Nb_2O_5$; 0 to 20% $WO_3$, 0 to 40% $TiO_2$; 0 to 20% $Bi_2O_3$; 0 to 15% $ZrO_2$; 0 to 20% $Ta_2O_5$; and 0 to 10% $GeO_2$.

16. The optical glass element according to claim 15 characterized in that an antireflective film is present on the surface glass layer.

17. The optical glass element according to claim 10 characterized in that an antireflective film is present on the surface glass layer.

* * * * *

UNITED STATES PATENT AND TRADEMARK OFFICE
CERTIFICATE OF CORRECTION

PATENT NO. : 8,486,536 B2 Page 1 of 1
APPLICATION NO. : 13/320466
DATED : July 16, 2013
INVENTOR(S) : Zou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 59 days.

Signed and Sealed this
Eighth Day of September, 2015

Michelle K. Lee
*Director of the United States Patent and Trademark Office*